United States Patent
Johansson et al.

(10) Patent No.: US 9,553,641 B2
(45) Date of Patent: Jan. 24, 2017

(54) DEVICE AND METHOD FOR HSPA WCDMA UPLINK PILOTS

(75) Inventors: Niklas Johansson, Uppsala (SE); Johan Bergman, Stockholm (SE); Bo Göransson, Sollentuna (SE); Johan Hultell, Solna (SE); Erik Larsson, Uppsala (SE); Fredrik Ovesjö, Älvsjö (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 422 days.

(21) Appl. No.: 13/202,679

(22) PCT Filed: Aug. 18, 2011

(86) PCT No.: PCT/SE2011/050998
§ 371 (c)(1),
(2), (4) Date: May 3, 2013

(87) PCT Pub. No.: WO2012/026867
PCT Pub. Date: Mar. 1, 2012

(65) Prior Publication Data
US 2013/0215872 A1 Aug. 22, 2013

Related U.S. Application Data

(60) Provisional application No. 61/376,329, filed on Aug. 24, 2010.

(51) Int. Cl.
*H04B 7/04* (2006.01)
*H04B 7/06* (2006.01)

(52) U.S. Cl.
CPC .......... *H04B 7/0456* (2013.01); *H04B 7/0404* (2013.01); *H04B 7/0617* (2013.01); *H04B 7/0634* (2013.01); *H04B 7/0684* (2013.01)

(58) Field of Classification Search
CPC .............. H04B 7/0456; H04B 1/707; H04B 2201/70701; H04B 7/2628; H04B 7/0404; H04B 7/0617; H04B 7/0634; H04B 7/0684; H04J 13/00; H04J 13/16
See application file for complete search history.

(56) References Cited

U.S. PATENT DOCUMENTS

| 2004/0001472 A1* | 1/2004 | Kwak | H04W 52/30 370/342 |
|---|---|---|---|
| 2004/0009786 A1* | 1/2004 | Terry | H04L 1/0001 455/522 |

(Continued)

FOREIGN PATENT DOCUMENTS

| FI | EP 2058967 A1 * | 5/2009 | ....... H04J 13/0044 |
|---|---|---|---|
| WO | WO 2005/122516 A1 | 12/2005 | |

(Continued)

OTHER PUBLICATIONS

3GPP TS 36.211 V8.5.0 (Dec. 2008), titled "3rd Generation Partnership Project; Technical Specification Group Radio Access Network; Evolved Universal Terrestrial Radio Access (E-UTRA); Physical Channels and Modulation(Release 8)", (TS 36.211 hereinafter) was published Dec. 2008, pp. 01-82.*

(Continued)

*Primary Examiner* — Andrew Lai
*Assistant Examiner* — Hoyet H Andrews
(74) *Attorney, Agent, or Firm* — Baker Botts, LLP

(57) ABSTRACT

A UE, for an HSPA WCDMA system, equipped with a first and a second transmit antenna, and arranged to use one or more sets of pre-coding weights for transmission. The UE is arranged to receive instructions from a NodeB on the set or sets of pre-coding weights to be used, and to transmit a first and a second pilot signal, and to use a first set of pre-coding weights for the first pilot signal and a second set of pre-coding weights for the second pilot signal, where the first set (Continued)

of pre-coding weights is the same as the UE uses for transmitting a first data stream, and to use different spreading codes for the first data stream and for the first pilot signal.

21 Claims, 10 Drawing Sheets

(56) References Cited

U.S. PATENT DOCUMENTS

| | | | | |
|---|---|---|---|---|
| 2007/0002963 A1* | 1/2007 | Pedersen | ............ | H04B 7/0634 375/267 |
| 2010/0080136 A1* | 4/2010 | Hunzinger | ........... | H04B 7/0404 370/252 |
| 2010/0103877 A1* | 4/2010 | Wang | ................. | H04B 7/061 370/328 |

FOREIGN PATENT DOCUMENTS

| | | |
|---|---|---|
| WO | WO 2008/098221 A1 | 8/2008 |
| WO | WO 2010/055676 A1 | 5/2010 |

OTHER PUBLICATIONS

Johan Bergman et al., titled HSPA Evolution—Boosting the performance of mobile broadband access, published in Ericsson Review No. I, 2008.*
3GPP TSG RAN WG1 #57 R1-091813 (May 2009), titled, "The Number of DRS/SRS antenna ports for UL" was published May 2009.*
3GPP TS 36.212 V9.4.0 (Sep. 2011), titled 3rd Generation Partnership Project; Technical Specification Group Radio Access Network; Evolved Universal Terrestrial Radio Access (E-UTRA); Multiplexing and channel coding (Release 9) was published Sep. 2011.*
R1-094358 from the 3GPP TSG-RAN WG1 Meeting #58bis Group at the meeting held in Miyazaki, Japan, Oct. 12-16, 2009.*
3GPP TSG RAN WG1 61bis R1-103708, titled Specifying Basic Building Blocks of UL Multi-Antenna Transmission (R1-103708 hereinafter) was published as Agenda Item 6.4.5, 3GPP TSG RAN WG1 61bis, pp. 01-08.*
3GPP TSG RAN WG1 Meeting #62 R1-104737, titled "On the benefits of Uplink Closed Loop Transmit Diversity", (R1-104737 hereinafter) was published as Agenda Item 5.6, 3GPP TSG RAN WG1 Meeting #62, pp. 01-17.*
3GPP TS 36.211 V8.5.0 (Dec. 2008), titled "3rd Generation Partnership Project; Technical Specification Group Radio Access Network; Evolved Universal Terrestrial Radio Access (E-UTRA); Physical Channels and Modulation (Release 8)", (TS 36.211 hereinafter) was published Dec. 2008, pp. 01-82.*
R1-094358 from the 3GPP TSG-RAN WG1 Meeting #58bis Group at the meeting held in Miyazaki, Japan, Oct. 12-16, 2009, which teaches Introduction of DC-HSUPA.*
International Preliminary Report on Patentability, mailed Nov. 30, 2012 in International Application No. PCT/SE2011/050998.
State Intellectual Property Office of People's Republic of China First Office Action and English Translation of First Office Action for Application No. 201180040882.9, transmitted to Baker Botts L.L.P. on May 18, 2015.
Examination Report dated Oct. 16, 2013 in New Zealand Application No. 605677.
International Search Report and Written Opinion in corresponding International application No. PCT/SE2011/050998 mailed Oct. 20, 2011.
3GPP TSG RAN WG1 Meeting #62; R1-104737; 3rd Generation Partnership Project, Mobile Competence Centre, "On the benfits of Uplink Closed Loop Transmit Diversity", Qualcomm Incorporated, Madrid, Spain, Aug. 23-27, 2010 (17 pages).
3GPP TSG RAN WG1 Meeting #64; R1-110834; 3rd Generation Partnership Project, Mobile Competence Centre, "Discussion on UL CL Tx diversity design aspects", Renesas Electronics Europe, Taipei, Taiwan, Feb. 21-25, 2011 ( 4 pages).
Russian Federation, Decision on Grant for Application No. 2013112928/07 filed Aug. 18, 2011 with English translation attached, transmitted to Baker Botts on Mar. 30, 2016, 10 pages, Mar. 30, 2016.
Russian Federation Office Action for Application No. 2013112928/07 filed Aug. 18, 2011, transmitted to Baker Botts on Sep. 1, 2015, 5 pages, Sep. 1, 2015.

* cited by examiner

| Code Book XX | | | |
|---|---|---|---|
| Set/vector | Pre-coding weights | | Code word |
| 0 | $Q_{11}$ | $Q_{21}$ | 00 |
| 1 | $Q_{12}$ | $Q_{22}$ | 01 |
| 2 | $Q_{13}$ | $Q_{23}$ | 10 |
| 3 | $Q_{14}$ | $Q_{24}$ | 11 |

Fig. 3

| Pilot symbol # | 0 | 1 | 2 | 3 | 4 | 5 | 6 | 7 |
|---|---|---|---|---|---|---|---|---|
| Primary pilot symbol pattern | $S_0$ | $S_1$ | $S_2$ | $S_3$ | $S_4$ | $S_5$ | $S_6$ | $S_7$ |
| Secondary pilot pattern A | $S_1^*$ | $-S_0^*$ | $S_3^*$ | $-S_2^*$ | $S_5^*$ | $-S_4^*$ | $S_7^*$ | $-S_6^*$ |
| Secondary pilot pattern B | $S_1^*$ | $-S_0^*$ | $-S_3^*$ | $S_2^*$ | $S_5^*$ | $-S_4^*$ | $-S_7^*$ | $S_6^*$ |

FIG. 4

| Bit # Slot #0 | N_pilot=3 | | | N_pilot=4 | | | | N_pilot=5 | | | | | N_pilot=6 | | | | | |
|---|---|---|---|---|---|---|---|---|---|---|---|---|---|---|---|---|---|---|
| | 0 | 1 | 2 | 0 | 1 | 2 | 3 | 0 | 1 | 2 | 3 | 4 | 0 | 1 | 2 | 3 | 4 | 5 |
| 1 | 1 | 0 | 1 | 1 | 0 | 1 | 0 | 1 | 0 | 1 | 0 | 0 | 1 | 0 | 1 | 0 | 1 | 1 |
| 2 | 0 | 1 | 1 | 1 | 1 | 0 | 0 | 0 | 1 | 1 | 0 | 0 | 1 | 1 | 0 | 0 | 1 | 1 |
| 3 | 0 | 0 | 1 | 1 | 1 | 1 | 0 | 0 | 0 | 1 | 1 | 1 | 1 | 1 | 1 | 0 | 0 | 0 |
| 4 | 0 | 1 | 1 | 1 | 1 | 0 | 0 | 0 | 1 | 1 | 1 | 0 | 1 | 0 | 0 | 0 | 0 | 1 |
| 5 | 1 | 1 | 1 | 1 | 0 | 0 | 0 | 1 | 1 | 1 | 1 | 1 | 1 | 0 | 0 | 0 | 0 | 0 |
| 6 | 1 | 0 | 1 | 1 | 0 | 1 | 0 | 1 | 0 | 1 | 0 | 0 | 1 | 0 | 1 | 0 | 1 | 1 |
| 7 | 1 | 0 | 1 | 1 | 0 | 1 | 0 | 1 | 0 | 1 | 1 | 0 | 1 | 0 | 1 | 0 | 0 | 1 |
| 8 | 0 | 1 | 1 | 1 | 0 | 0 | 0 | 0 | 1 | 1 | 1 | 0 | 1 | 1 | 0 | 0 | 0 | 1 |
| 9 | 1 | 0 | 1 | 1 | 1 | 1 | 0 | 1 | 0 | 1 | 0 | 0 | 1 | 0 | 1 | 0 | 1 | 1 |
| 10 | 0 | 0 | 1 | 1 | 0 | 1 | 0 | 0 | 0 | 1 | 0 | 1 | 1 | 1 | 1 | 0 | 1 | 0 |
| 11 | 1 | 0 | 1 | 1 | 1 | 1 | 0 | 1 | 1 | 1 | 1 | 1 | 1 | 0 | 1 | 0 | 0 | 0 |
| 12 | 1 | 1 | 1 | 1 | 0 | 0 | 0 | 1 | 1 | 1 | 0 | 0 | 1 | 0 | 0 | 0 | 1 | 0 |
| 13 | 0 | 1 | 1 | 1 | 0 | 0 | 0 | 1 | 1 | 1 | 1 | 1 | 1 | 1 | 0 | 0 | 0 | 1 |
| 14 | 0 | 1 | 1 | 1 | 1 | 0 | 0 | 0 | 1 | 1 | 0 | 1 | 1 | 1 | 0 | 0 | 1 | 0 |

FIG. 5 Secondary pilot bit patterns for pilot 2, $N_{pilot}$ = 3, 4, 5 and 6

| Bit # | N$_{pilot}$ = 7 | | | | | | | N$_{pilot}$ = 8 | | | | | | | |
|---|---|---|---|---|---|---|---|---|---|---|---|---|---|---|---|
| Slot #0 | 0 | 1 | 2 | 3 | 4 | 5 | 6 | 0 | 1 | 2 | 3 | 4 | 5 | 6 | 7 |
| 1 | 1 | 0 | 1 | 0 | 1 | 1 | 1 | 1 | 0 | 0 | 1 | 1 | 0 | 0 | 0 |
| 2 | 1 | 1 | 0 | 0 | 1 | 1 | 1 | 1 | 1 | 0 | 0 | 1 | 1 | 0 | 0 |
| 3 | 1 | 1 | 1 | 0 | 0 | 0 | 1 | 1 | 1 | 0 | 1 | 1 | 1 | 0 | 1 |
| 4 | 1 | 0 | 0 | 0 | 0 | 1 | 1 | 1 | 0 | 0 | 0 | 1 | 0 | 0 | 0 |
| 5 | 1 | 0 | 0 | 0 | 0 | 0 | 1 | 1 | 0 | 0 | 0 | 1 | 1 | 0 | 1 |
| 6 | 1 | 0 | 1 | 0 | 1 | 1 | 1 | 1 | 0 | 0 | 1 | 1 | 1 | 0 | 0 |
| 7 | 1 | 1 | 1 | 0 | 0 | 1 | 1 | 1 | 1 | 0 | 0 | 1 | 0 | 0 | 0 |
| 8 | 1 | 0 | 1 | 0 | 1 | 1 | 1 | 1 | 0 | 0 | 1 | 1 | 0 | 0 | 0 |
| 9 | 1 | 1 | 1 | 0 | 0 | 1 | 1 | 1 | 1 | 0 | 1 | 1 | 0 | 0 | 0 |
| 10 | 1 | 0 | 0 | 0 | 1 | 0 | 1 | 1 | 0 | 0 | 1 | 1 | 1 | 0 | 0 |
| 11 | 1 | 0 | 0 | 0 | 1 | 0 | 1 | 1 | 0 | 0 | 1 | 1 | 0 | 0 | 1 |
| 12 | 1 | 1 | 0 | 0 | 0 | 0 | 1 | 1 | 1 | 0 | 0 | 1 | 1 | 0 | 1 |
| 13 | 1 | 1 | 0 | 0 | 1 | 0 | 1 | 1 | 1 | 0 | 0 | 1 | 0 | 0 | 0 |
| 14 | 1 | 1 | 0 | 0 | 1 | 0 | 1 | 1 | 1 | 0 | 0 | 1 | 0 | 0 | 1 |

FIG. 6 Secondary pilot bit patterns for pilot 2, N$_{pilot}$ = 7 and 8

DEVICE AND METHOD FOR HSPA WCDMA UPLINK PILOTS

This application is the U.S. national phase of International Application No. PCT/SE2011/050998 filed 18 Aug. 2011 which designated the U.S. and claims priority to U.S. Provisional Application No. 61/376,329 filed 24 Aug. 2010, the entire contents of each of which are hereby incorporated by reference.

TECHNICAL FIELD

The present invention discloses improved devices and methods for transmitting and receiving HSPA WCDMA uplink pilot signals.

BACKGROUND

In HSPA enabled WCDMA systems that use so called uplink closed loop beam forming, sometimes also referred to as uplink closed loop transmit diversity, a NodeB informs a beam forming capable UE of the beam forming that the UE should use. This is usually done by means of transmitting a code word to the UE which identifies a set of pre-coding weights ("a pre-coding vector") in a code book. The pre-coding weights in the pre-coding vector are then used by the UE by using each pre-coding weight in the set for multiplication with information which is transmitted from one of the UE's antennas, i.e. the pre-coding vector comprises one pre-coding weight for each of the antennas.

In order for the NodeB to be able to determine a suitable pre-coding vector for a particular UE, the NodeB must have information about the radio channel conditions between the NodeB and the UE, information which is usually obtained by means of (multiple) pilot signals which are transmitted from the UE to the NodeB. The NodeB which determines the pre-coding vector for a UE is usually the UE's serving NodeB, although it can also in some cases be another NodeB or the UE's Radio Network Controller, its RNC.

As will be realized, it is advantageous if a pilot or sounding signal for HSPA WCDMA closed loop beam forming is designed so that the impact on WCDMA channelization code use, hardware complexity, signaling overhead, interference level, link and system performance and soft handover operation is optimized.

SUMMARY

It is an object of the present invention to obtain a solution for transmitting pilot signals in HSPA enabled WCDMA systems which fulfills at least some of the desires stated above.

Such a solution is obtained by means of a User Equipment, a UE, for an HSPA enabled WCDMA system. The UE is equipped with at least a first and a second transmit antenna and is arranged to use one or more sets of pre-coding weights, where each pre-coding weight in the one or more sets is used by the UE for multiplication with information which is transmitted from one of the UE's antennas, i.e. one pre-coding weight is used per antenna.

The UE is also arranged to receive instructions from a NodeB on the set or sets of pre-coding weights to be used, and to transmit a first and a second pilot signal, and to use a first set of pre-coding weights for the first pilot signal and a second set of pre-coding weights for the second pilot signal. The first set of pre-coding weights is the same as the UE uses for transmitting a first data stream, and the UE is arranged to use different spreading codes for the first data stream and for the first pilot signal.

In embodiments, the UE is arranged to also transmit a second data stream using the second set of pre-coding weights, and to use different spreading codes for the second data stream and for the second pilot signal.

In embodiments, the UE is also arranged to transmit a second data stream using the second set of pre-coding weights, and to transmit the second data stream and the second pilot signal with the same spreading code but in a time-multiplexed manner.

The embodiments with a first and a second data stream are useful in, for example, MIMO applications.

In embodiments, the UE is arranged to use a first and second set of pre-coding weights which are orthogonal to each other.

In embodiments, the UE is also arranged to use different levels of output power for transmitting the first and second pilot signals, and in some such embodiments the UE is arranged to receive instructions on the different power levels from the NodeB.

In embodiments, the UE is also arranged to use the pilot symbols of the WCDMA DPCCH channel as the first pilot signal and to use as the second pilot signal the pilot symbols of another WCDMA channel, where the pilot symbols of the other WCDMA channel use the same slot format as the pilot symbols of the WCDMA DPCCH channel, and to use different spreading codes for the WCDMA DPCCH channel and said other WCDMA channel. In some such embodiments, the UE is arranged to include control signaling and/or data symbols in the other WCDMA channel.

In embodiments, the UE is also arranged to include control signaling and/or data symbols in the other WCDMA channel.

In embodiments, the UE is also arranged to use the pilot symbol sequence of the WCDMA DPCCH channel as the first pilot signal and to use as the second pilot signal a sequence of pilot symbols which the UE is arranged to transmit with the same spreading code as the WCDMA DPCCH channel, but which is orthogonal to the pilot symbol sequence of the WCDMA DPCCH channel.

In embodiments, the UE is also arranged to use a number of pilot signals which is equal to the number of antennas of the UE.

The invention also discloses a NodeB for an HSPA enabled WCDMA system which is arranged to receive from an UE a first and a second pilot signal transmitted from the UE with respective first and second sets of pre-coding weights, as well as to receive from the UE a first data stream which has been transmitted from the UE with the first set of pre-coding weights but with a different spreading code than the first pilot signal. The NodeB is arranged to transmit instructions to the UE on at least one of the first and second sets of pre-coding weights, and to use the first and second pilot signals in order to determine those instructions.

In embodiments, the NodeB is arranged to also receive a second data stream from the UE which has been transmitted using the second set of pre-coding weights, but with a different spreading code than the second pilot signal.

In embodiments, the NodeB is arranged to also receive a second data stream from the UE which has been transmitted using the second set of pre-coding weights, and with the same spreading code as the second pilot signal, but in a time-multiplexed manner.

In embodiments, the NodeB is arranged to transmit instructions to the UE regarding different levels of output power that the UE should use for transmitting the first and second pilot signals.

BRIEF DESCRIPTION OF THE DRAWINGS

The invention will be described in more detail in the following, with reference to the appended drawings, in which FIG. 3 shows an example of a code book, and FIGS. 4-6 show examples of pilot patterns and FIG. 7 shows a block diagram of an UE.

DETAILED DESCRIPTION

Figure 1:
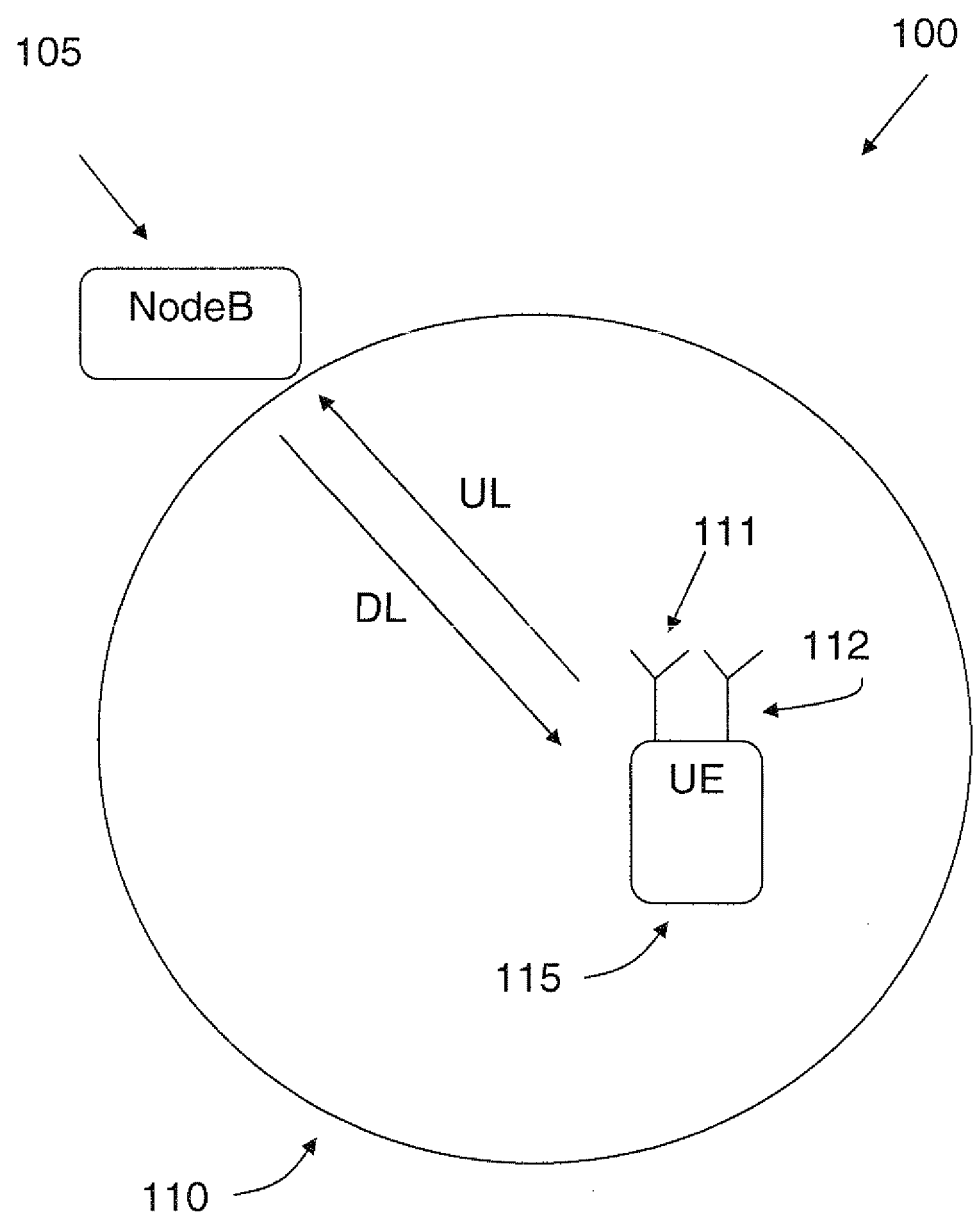
FIG. 1 shows a schematic view of a WCDMA system.

Embodiments of the invention will be described more fully hereinafter with reference to the accompanying drawings, in which embodiments of the invention are shown. The invention may, however, be embodied in many different forms and should not be construed as being limited to the embodiments set forth herein. Like numbers in the drawings refer to like elements throughout.

The terminology used herein is for the purpose of describing particular embodiments only, and is not intended to limit the invention.

FIG. 1 shows a schematic view of a part of a WCDMA system 100 which is enabled for HSPA. The system comprises one or more cells 110, each of which can accommodate one or more User Equipments, UEs 115. One or more of the UEs 115 in a cell such as the one 110 can be equipped with more than one transmit antenna. As an example, the UE 115 is shown with two antennas 111, 112. Naturally, in most embodiments, a UE such as the one 115 which is equipped with multiple antennas will be arranged to use all of its antennas both for transmission and reception.

For each cell such as the one 110, there will be a controlling node, in WCDMA known as a NodeB. The NodeB of the cell 110 is shown as 105 in FIG. 1. A WCDMA system also comprises other, "higher level" nodes than those shown in FIG. 1, for example the node known as RNC, Radio Network Controller, which is a node that, inter alia, controls one or more NodeBs, and which may also, if it is a so called Serving RNC, S-RNC, transmit control signals directly to a specific UE through the NodeB of the cell of the UE in question.

The WCDMA system 100 depicted in FIG. 1 utilizes so called uplink closed loop transmit diversity, which is sometimes also referred to as uplink closed loop beam forming. In such a system, a UE 115 with more than one transmit antenna is arranged to use its antennas for beam forming at least in the uplink, UL, direction, and the beam forming is controlled by the NodeB 105 although it is performed by the UE.

The NodeB 105 controls the beam forming of the UE 115 by means of transmitting information to the UE on one or more sets of so called pre-coding weights. These sets are also sometimes referred to as pre-coding vectors. Each pre-coding weight in such a set is intended to be multiplied with the signals from one of the antennas 111, 112, of the UE prior to transmission, which will give rise to a "shaped beam" in the transmissions from the UE 115. By choosing the proper set of pre-coding weights, the NodeB 105 can cause the transmit beam from the UE 115 to have a shape which is optimal for the situation, and the NodeB can also, by adaptively changing the set of pre-coding weights, cause the transmit beam from the UE to adapt to the circumstances in an optimal manner. Such beam shaping is also referred to as beam forming. In one particular case, all antennas but one is assigned a pre-coding weight of "zero", i.e. 0, and one antenna is assigned the pre-coding weight "one", i.e. 1. In the example with two antennas, such a pre-coding vector would then be [0, 1] or [1, 0]. This corresponds to shutting off of all but one antenna and only using the remaining antenna. When an antenna has been assigned a pre-coding weight of zero, this equals making no transmissions from that antenna, and conversely, for an antenna that has been assigned a pre-coding weight of one, transmission can, in fact, be made without any multiplication, since this is the significance of multiplication by one.

In order for the NodeB 105 to be able to determine an optimal pre-coding vector for the UE 115, the NodeB needs to be able to analyze the radio channel conditions between the NodeB and the UE, which is usually done by means of pilot signals which are transmitted from the UE. Regarding the pilot signals as disclosed herein, there are at least two issues to observe: first of all, how the pilot signals should be transmitted from the UE, and secondly, how the pilot signals should be designed. These two issues will be described below, with reference to two pilot signals, referred to as pilot 1 and pilot 2. It should however be pointed out that the principles shown herein can be applied to a larger number of pilot signals than two.

Transmitting Pilot Signals

Figure 2:
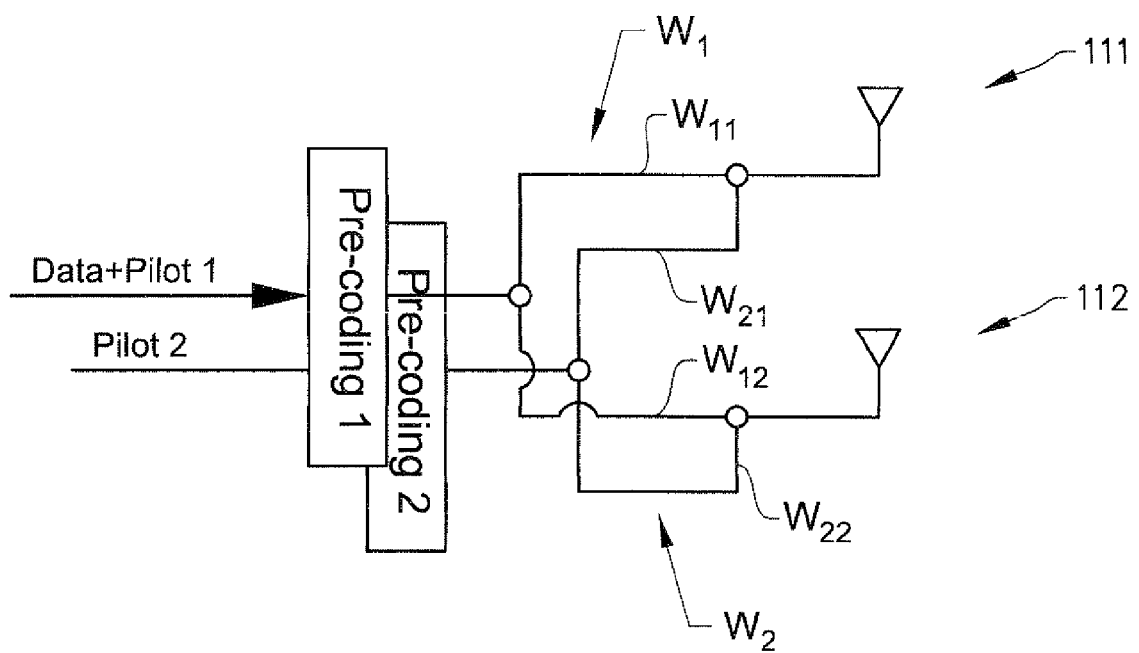
FIG. 2 shows an example of a technique for beam forming.

In embodiments, the UE 115 is arranged to transmit pilot 1 using the same pre-coding weights as the UE uses for transmitting data, and to transmit pilot 2 using another set of pre-coding weights. This is illustrated in FIG. 2, which also serves to further illustrate the concept of pre-coding vectors which comprise pre-coding weights: FIG. 2 shows the two transmit antennas 111 and 112 of the UE 115. Data and pilot signal 1 are multiplied with a first pre-coding vector, $W_1$, and pilot signal 2 is multiplied with a second pre-coding vector, $W_2$, prior to transmittal from the antennas 111 and 112. The pre-coding vector $W_1$ comprises pre-coding weights $W_{11}$ and $W_{12}$, and the pre-coding vector $W_2$ comprises pre-coding weights $W_{21}$ and $W_{22}$. Thus, data and pilot signal 1 are transmitted from antenna 111 after multiplication with pre-coding weight $W_{11}$, and from antenna 112 after multiplication with pre-coding weight $W_{12}$, and pilot signal 2 is transmitted from antenna 111 after multiplication with pre-coding weight $W_{21}$, and from antenna 112 after multiplication with pre-coding weight $W_{22}$.

Soft handover is facilitated if pilot 1 is transmitted using the same pre-coding weights as data, as described above. (Using pilot patterns or a new spreading code for pilot 2 will make the transmission of the "sounding signal", pilot 2, unnoticeable to "legacy" NodeBs, i.e. NodeBs which are not capable of closed loop transmit diversity). In this manner, soft handover will be supported even when legacy NodeBs, are used together with NodeBs which are capable of closed loop transmit diversity.

In this and the other alternatives where a pilot signal is transmitted with the same pre-coding weights as data, the pilot signal can be separated from the data in the receiving NodeB by means of the UE using different spreading codes for the pilot and for the data.

Suitably, the pre-coding vectors (i.e. the sets of pre-coding weights) are known in advance to both the UE and the NodeB, i.e. the pre-coding vectors are stored in advance in both the UE and the NodeB. Since this is the case, the NodeB only needs to identify the pre-coding vector which should be used by the UE, as opposed to explicitly informing the UE of the pre-coding weights as such.

In such embodiments, the pre-coding vectors which should be used by a UE are identified to the UE by the NodeB by means of so called code words. The code words, in turn, are organized in code books, so that a NodeB can either identify a code book to a UE (as, for example, in the case of a code book with only one vector), or both a code book and the code word within the code book in question. Suitably, the code book which should be used is signaled to the UE at less frequent points in time than the code words, so that a code book is signaled to the UE, and then code words within that code book are signaled to the UE. In one particular case, no code book is signaled, since in that case only one code book is used, so that all that needs to be signaled is the code words within that code book.

The concept of code words organized in code books is illustrated in FIG. 3, which shows a code book numbered XX, which comprises four sets of pre-coding weights, i.e. four pre-coding vectors. The pre-coding vectors are, as an example, numbered as 0-3, and have been assigned binary code words which correspond to their numbers, e.g. pre-coding vector 0 is identified by code word 00, and code word 3 is identified by code word 11. Each pre-coding vector in the code book comprises two pre-coding weights, which means that the code book is intended for a UE with two transmit antennas. Naturally, for a UE with N transmit antennas, code books can be used with vectors with N pre-coding weights, one for each antenna. As mentioned before, each pre-coding weight in a pre-coding vector is intended for multiplication with the signal which is to be transmitted from one of the antennas of the UE. For example, in the case of the code book in FIG. 3, if code word 00 is transmitted to the UE, pre-coding weight $Q_{11}$ will be applied to the signals transmitted from one of the antennas of the UE and pre-coding weight $Q_{21}$ will be applied to signals from the other antenna.

In embodiments, the UE 115 is arranged to use a pre-coding vector for pilot signal 2 which is orthogonal to the one which is used for pilot signal 1. This allows the NodeB to calculate the total channel if it also knows the pre-coding vectors that were used, which is usually the case since the NodeB instructs the UE regarding these vectors. The term "total channel" is used here to refer to the totality of the individual radio channels between pairs of antennas at the UE and the NodeB. Assume that there are two antennas at the UE and two antennas at the NodeB. This then gives rise to four individual radio channels.

In other embodiments, the instructions, suitably in the form of code words, from the Node-B to the UE give rise to relative pre-coding weight changes, such as phase changes relative to the most recently used pre-coding, so that it is not necessary for the NodeB to know which pre-coding was used when the pilots were transmitted. This avoids the signaling of the used pre-coding which is usually required in closed loop transmit diversity solutions. This is beneficial since uplink overhead is reduced, while at the same time soft handover is possible, which usually requires the other Node-Bs in the active set to be informed about the pre-coding that was used.

Another solution is to transmit pilot 2 using a pre-coding vector that is not orthogonal to the one used for pilot 1, in which case the pre-coding of pilot 2 can change independently of the pre-coding of pilot 1. In such embodiments, the pre-coding of pilot 2 can change from WCDMA symbol to WCDMA symbol, or from slot to slot. In this manner, pilot 2 can be used as a "probing signal", and the instructions from the NodeB to the UE can consist of an indication to change the pre-coding weights applied to the data and pilot 1 based on the measured power received from the pilot 2. Note that the NodeB can either signal that the UE should use the same pre-coding weights for data and pilot 1 as for pilot 2, or that the UE should increase/decrease the relative pre-coding phase and or amplitude difference between pilots 1 and 2 by a predefined amount. Also, this option avoids the signaling of the used pre-coding which is usually required in closed loop transmit diversity solutions, but still soft handover is facilitated.

The level of output power used by the UE 115 for pilot 2 can be the same as that for pilot 1, or it can be "offset" relative to the level of output power of pilot 1. This offset can be signaled from the NodeB to the UE using e.g. RRC signaling when a UE is configured in closed loop beam forming mode, or it can be broadcast to all UEs in the cell, e.g. on the SIB, System Information Broadcast.

In many embodiments, pilot 1 is transmitted using the same pre-coding as the data, as illustrated in FIG. 2, and pilot 2 is only used to determine when and how to switch the pre-coding of pilot 1 and data. Since, in such embodiments, pilot 2 is not used as a reference for data symbol demodulation, pilot 2 does not need to be transmitted all the time, and/or when it is transmitted, it can be transmitted with a lower output power level. This reduces the required additional overhead for closed loop transmit diversity. The lower output power level for pilot 2 can either be signaled from the NodeB, or, as an alternative, it can be set by the standard which would then specify that pilot 2 should always be transmitted with xdB less (or more) output power than pilot 1.

Soft handover is facilitated if pilot 1 is transmitted using the same pre-coding weights as data. If the UE uses orthogonal pilot patterns, i.e. symbol sequences, for pilot and 2, or a new spreading code for pilot 2, this will make the transmission of pilot 2 unnoticeable to a "legacy" NodeB. This way soft handover can be supported even when legacy base stations are used together with new closed loop transmit diversity capable base stations in the active set. In addition, if the pre-coding feedback consists of relative pre-coding weight changes, there is no need to signal the pre-coding that the UE applies if pilot 1 is transmitted using the same pre-coding weights as data.

Design of Pilot Signals

One option for the pilot signals is to transmit pilot 1 and pilot 2 using the same spreading code. In this way, no new spreading code would be required, but instead, for pilot 1 the UE would use the symbols contained in, for example, the WCDMA channel, DPCCH, and pilot 2 would be used to simultaneously transmit symbols which have been altered to be different, suitably orthogonal, to the pilot sequence for pilot 1.

An example of how to construct two pilot patterns that are orthogonal to the DPCCH pilot symbols is illustrated in the table shown in FIG. 4. This table shows how two secondary pilot patterns, pattern A and pattern B, that are orthogonal to a primary pilot pattern can be designed. Because they are orthogonal, the secondary pilots will not interfere, for example when the primary pilot pattern is used for estimation of the channel through which the primary pilot was transmitted. $s_i^*$ denotes the complex conjugate of symbol $s_i$.

If four pilot symbols are contained in DPCCH and they are denoted $s_0$, $s_1$, $s_2$ and $s_3$, pilot 1 would consist of the symbols $s_0$, $s_1$, $s_2$ and $s_3$, while pilot 2 (Secondary pilot symbol pattern A) would consist of the symbols $s_1^*$, $-s_0^*$, $s_3^*$ and $-s_2^*$, where $s_i^*$ denotes the complex conjugate of symbol $s_i$. If an even number of pilot symbols is desired, the pilot patterns in the table in FIG. 4 can be taken directly from the columns for pilot symbol 0 to number-of-pilot-symbols minus 1. If an uneven number of pilot symbols is desired, the last symbol in the secondary pilot pattern is not transmitted.

In the tables of FIGS. 5 and 6, the secondary pilot pattern A has been used for all configurations except for the case $N_{pilot}=8$, where secondary pilot pattern B has been used to construct new pilot patterns that can be used for pilot 2 and that are orthogonal to the DPCCH pilots which can be used for pilot 1.

This is one example that can avoid destroying the properties of the frame synchronization word, which is indicated by the gray colored columns, but other alterations of the DPCCH pilot patterns can also be envisioned.

When the channel between the UE and the NodeB is estimated by the NodeB, assuming the symbols in DPCCH, only the channel through which pilot 1 was transmitted will be estimated, and when the channel is estimated using the knowledge of the secondary pilot pattern, only the channel through which pilot 2 was transmitted will be estimated. Such a solution enables both pilots to be simultaneously transmitted, and reuses the existing DPCCH, so no new spreading code is required.

In another embodiment, pilot 1 and pilot 2 are multiplexed in time. In one such embodiment, some of the pilot symbols on DPCCH are assigned to pilot 1 and the rest to pilot 2. In another embodiment, pilot 1 is transmitted using the DPCCH pilot symbols in some slots, and pilot 2 is transmitted using the DPCCH pilot symbols in other slots. For example, the time division multiplexing pattern could be to transmit pilot 2 every n:th slot, and to transmit pilot 1 in the other slots. This reuses the existing DPCCH, so no new spreading code would be required. The ratio with which the UE should transmit pilot 2 could either be semi-static and decided via RRC signaling or decided dynamically by the Node-B which could order the UE to transmit pilot 2 by, e.g., transmitting an HS-SCCH order.

In other embodiments, the pilot symbols contained in the WCDMA channel DPCCH are used as pilot 1 with a certain spreading code, and another spreading code is used for the pilot symbols of pilot 2. Typically, the slot format of pilot 2 would be as for DPCCH, but where non-pilot symbols are transmitted in DPCCH, pilot symbols or no symbols are transmitted for pilot 2. Another alternative is to use a new slot format for pilot 2. This new channel could then contain pilot 2, possibly control signaling and even data symbols. This solution would enable both pilots to be simultaneously transmitted, but would require a new spreading code, possibly one with a different spreading factor, to be used.

Figure 7:
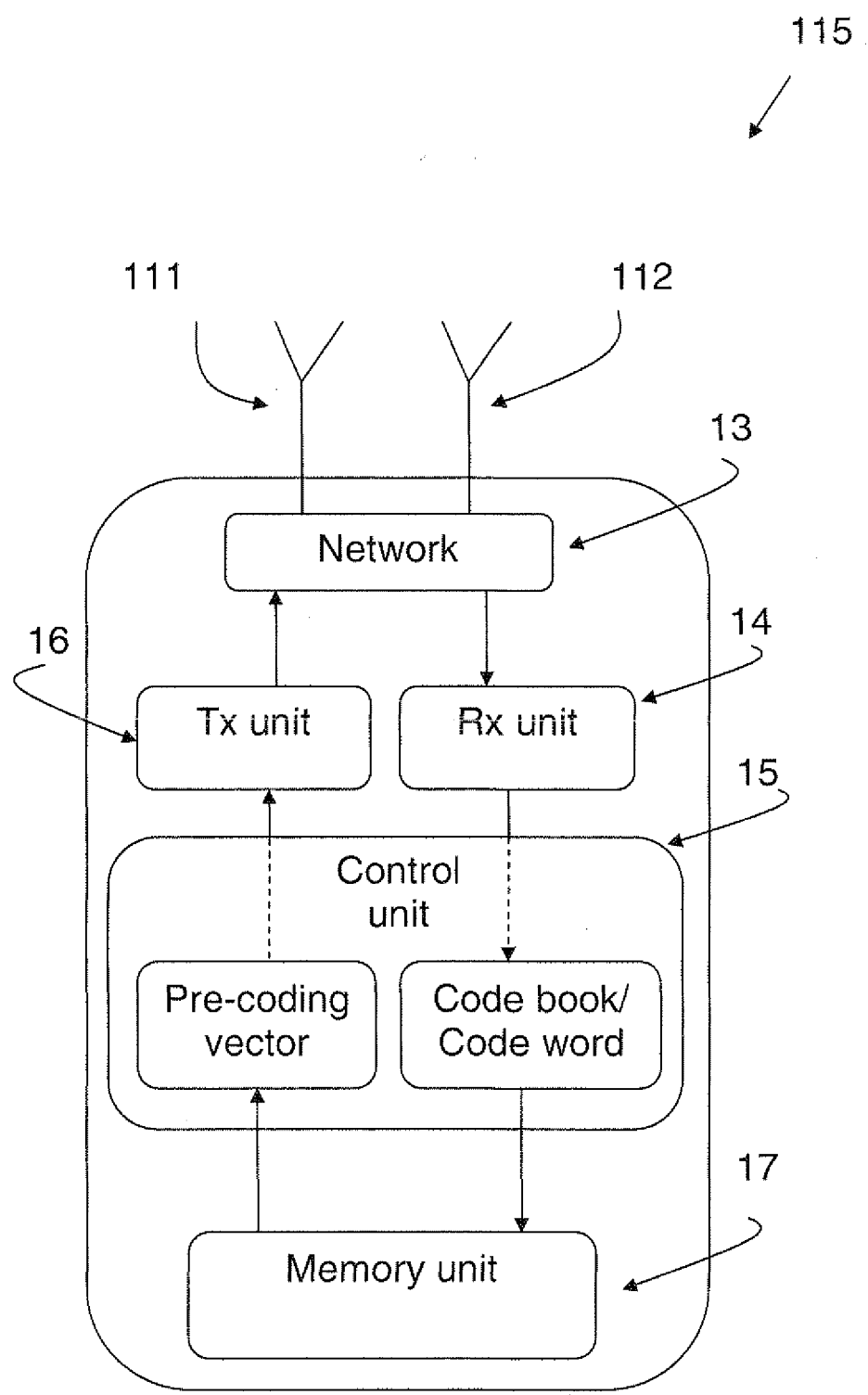

FIG. 7 shows an example of a block diagram of the UE 115: the UE 115 comprises, as was also shown in FIG. 1, two antennas 111 and 112, which are suitably both transmit and receive antennas. In addition, there is a transmit unit, Tx unit 16, and a Receive Unit, Rx Unit 14, which are connected to the two antennas via an antenna network 13. The UE also comprises a Control Unit 15, which receives transmissions from the NodeB via the antennas 111 and 112 and the Rx unit 14, and which also controls transmissions to the NodeB via the transmit unit 16 and the antennas 111 and 112. The control unit thus receives instructions from the NodeB regarding pre-coding vectors to use in the transmissions to the NodeB, instructions which suitably identify one or more code books, and code words from those code books. In the case of only one code book, the code book need not be identified, since there are no alternative code books to choose from. This information is used to retrieve the proper pre-coding vectors from a memory unit 17, where the information on code books and their code words and corresponding pre-coding vectors are suitably stored.

The pre-coding vector or vectors which are then retrieved from the memory unit 17 are passed on to the transmit unit 16, so that each pre-coding weight is applied to "its" traffic before being transmitted from one of the antennas 111 and 112.

Figure 8:
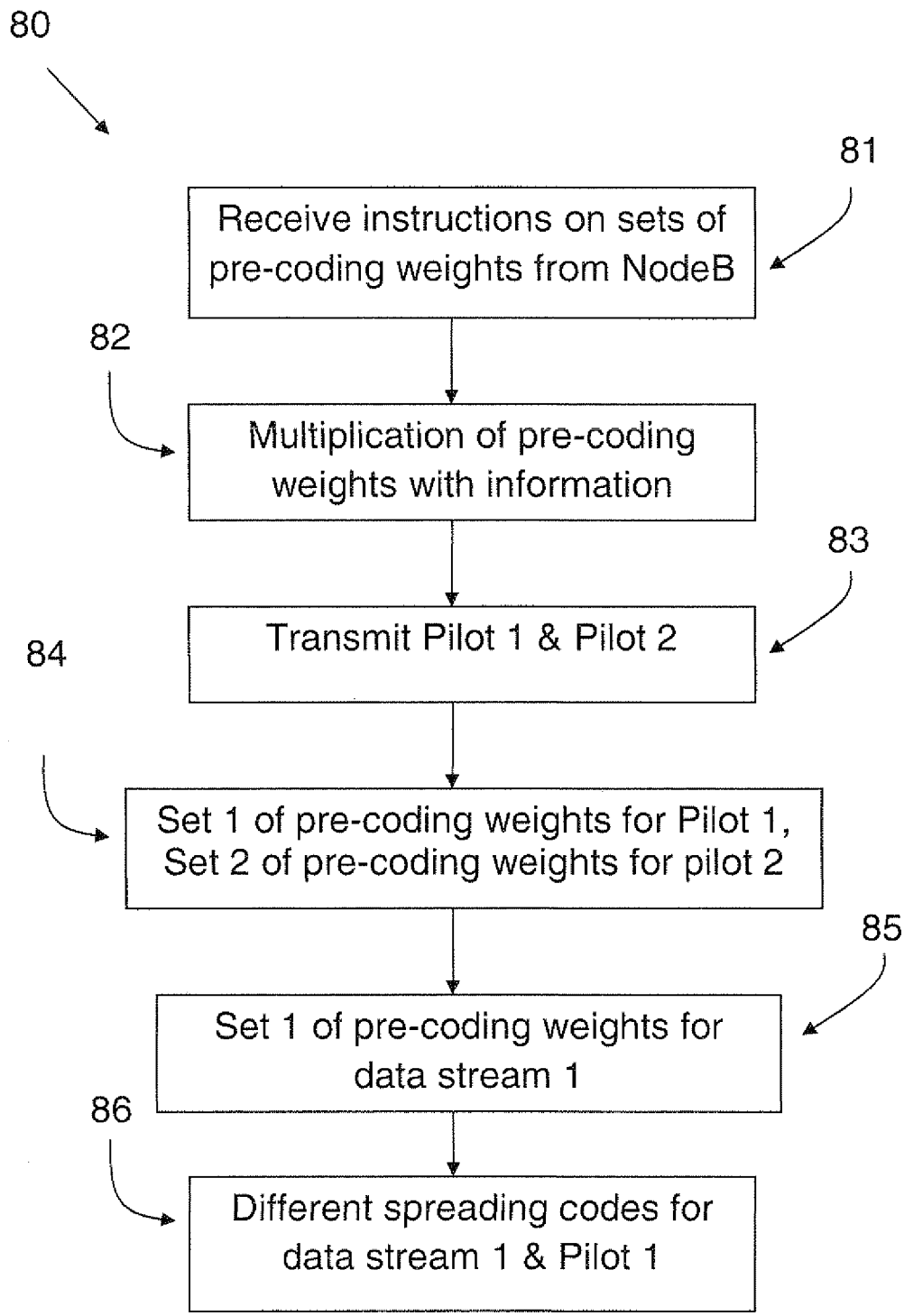
FIG. 8 shows a flow chart of a method for operating a UE.

FIG. 8 shows a flow chart of a method 80 for operating a User Equipment such as the UE 115, i.e. a UE 115 for an HSPA enabled WCDMA system. Thus, the UE is equipped with at least a first 111 and a second 112 transmit antenna, and, as indicated in step 81, comprises receiving instructions from a NodeB on one or more sets of pre-coding weights to be used in transmissions from the UE. As indicated in step 82, the method 80 comprises using each pre-coding weight in said one or more sets for multiplication with information which is transmitted from one of the UE's antennas.

The method 80 further comprises, as indicated in step 83, transmitting a first and a second pilot signal, and, as indicated in step 84, using a first of said sets of pre-coding weights for the first pilot signal and a second of said sets of pre-coding weights for the second pilot signal, and also using, as indicated in step 85, the first set of pre-coding weights for transmitting a first data stream. In addition, the method 80 further comprises, as indicated in step 86, using different spreading codes for the first data stream and for the first pilot signal.

In embodiments, the method 80 further comprises transmitting a second data stream using the second set of pre-coding weights, and using different spreading codes for the second data stream and for the second pilot signal.

In embodiments, the method 80 further comprises transmitting a second data stream using the second set of pre-coding weights, and transmitting the second data stream and the second pilot signal with the same spreading code but in a time-multiplexed manner.

In embodiments, the method 80 further comprises using different levels of output power for transmitting the first and second pilot signals.

Figure 9:
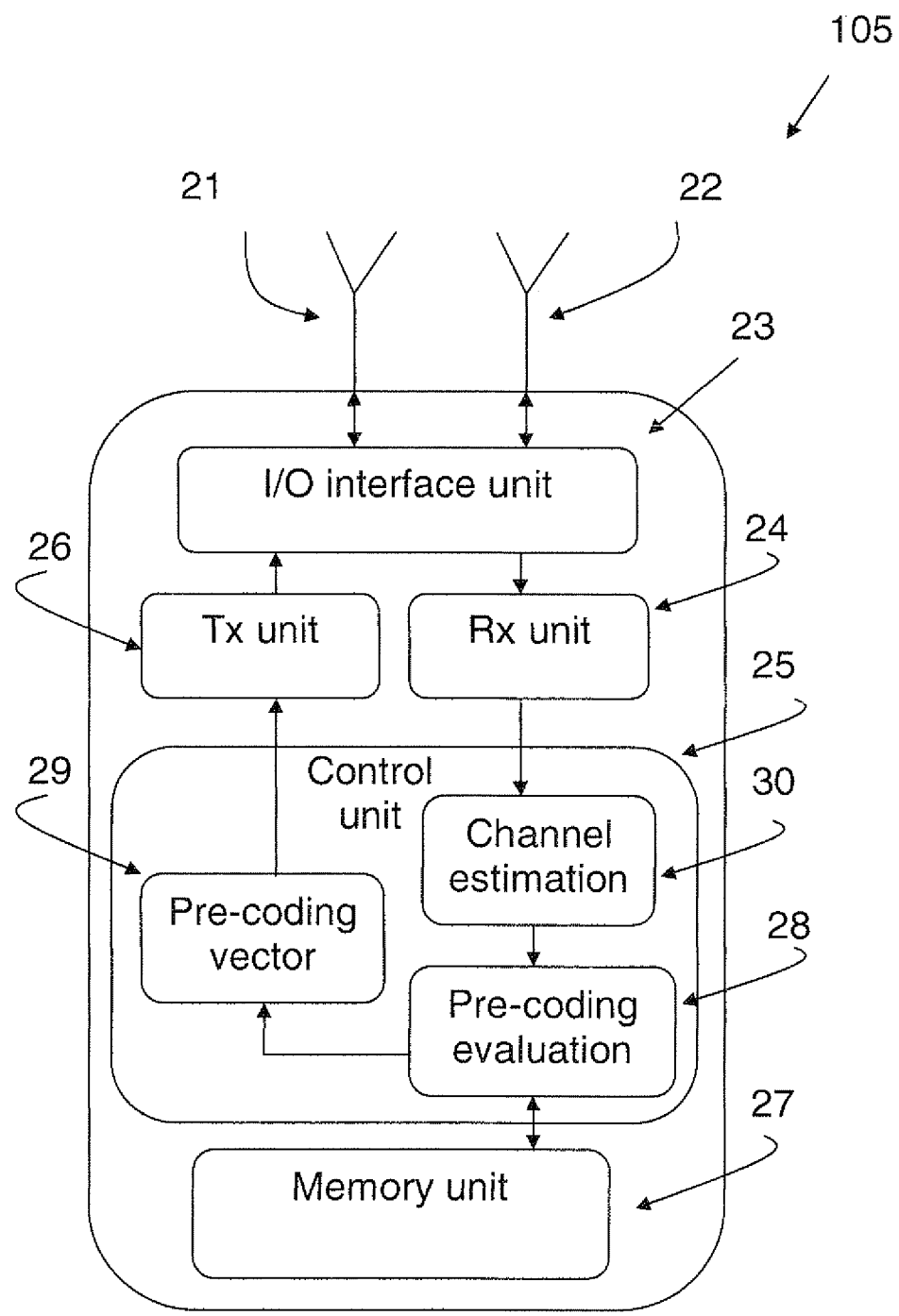
FIG. 9 shows a block diagram of a NodeB.

FIG. 9 shows an embodiment of a NodeB 105. The NodeB 105 is a NodeB for an HSPA enabled WCDMA system, and is equipped with a first 21 and a second 22 antenna, both of which are suitably used for transmission and reception. It should be pointed out that although the UE is suitably equipped with more than one antenna, the NodeB doesn't need to have more than one antenna, although, if, for example MIMO operation is desired, two or more antennas at the NodeB will enhance the NodeB's operation.

In addition to the antennas 21 and 22, the NodeB 105 comprises an input and output interface unit, I/O interface unit 23, which handles the NodeB's interface towards, for example, UEs, via the antennas 21 and 22, as well, as for example, handling its interface towards other nodes in the WCDMA system, such as the RNC or other NodeBs. Such interfaces may be either radio interfaces or landline interfaces.

In addition, the NodeB 105 comprises a transmit unit, Tx Unit 26, and a Receive Unit, Rx Unit 24. The NodeB 105 UE also comprises a Control Unit 25, which receives transmissions from UEs via the I/O interface unit 23 and the Rx unit 24, and which also controls transmissions to UEs via the transmit unit 26 and the I/O interface unit 23.

Thus, the Control Unit 25 analyzes pilot signals in the transmissions which are received from the UEs, and uses this analysis in order to gain information on the channel between the NodeB and the UE, and then determines the pre-coding vectors which a UE should use based on this analysis. The analysis can, for example, be performed in a special Channel Estimation Unit 30 together with a Pre-coding evaluation unit 28, both of which are suitably part of the Control Unit 25. Suitably, as will be explained in more detail in the following, the results of the channel estimation are sent to the pre-coding evaluation unit 28, which then evaluates all of the all of the pre-coding vectors which are available in the current code book in order to, for example, determine which of the available pre-coding vectors that would give the highest SINR for a certain data stream.

The available pre-coding vectors of the current code book are suitably retrieved from a Memory Unit 27, where pre-coding vectors of all code books are stored.

The chosen pre-coding vector, or rather, the instructions for it, e.g. a code word, is then retrieved from the Memory Unit 27, and passed to a pre-coding vector unit 29, which may or may not be a part of the Control Unit 25 as such, and which then controls the transmission of the instructions for the pre-coding vectors to the UE via the Transmit Unit 26 and the antennas 21 and 22.

The instructions which are transmitted to the UE on pre-coding vectors can either be explicit instructions (in the form of code words) on the pre-coding vectors for both the first and the second pilot signal, or, alternatively, they can be instructions on only one of the pilot signals, suitably the first pilot signal, and the UE can be arranged to choose the pre-coding vector for the second pilot signal on its own, or, alternatively, the UE can be arranged to derive the pre-coding vector for the second pilot signal from the pre-coding vector of the first pilot signal, which can, for example, be specified by the system standard.

The instructions on pre-coding weights, i.e. on the pre-coding vector, are either instructions on relative changes to the UE's currently used sets of pre-coding weights, or instructions identifying a set or sets of pre-coding weights to be used by the UE.

In embodiments, the Channel Evaluation unit 28 also analyzes the transmission from the UE with the aim of determining different levels of output power that the UE should use for transmitting the first and second pilot signals. In the MIMO case, the NodeB is also, in embodiments, arranged to transmit instruction to the UE for different output power levels for the different data streams, and the UE is then arranged to receive, process and act on such instructions.

Figure 10:
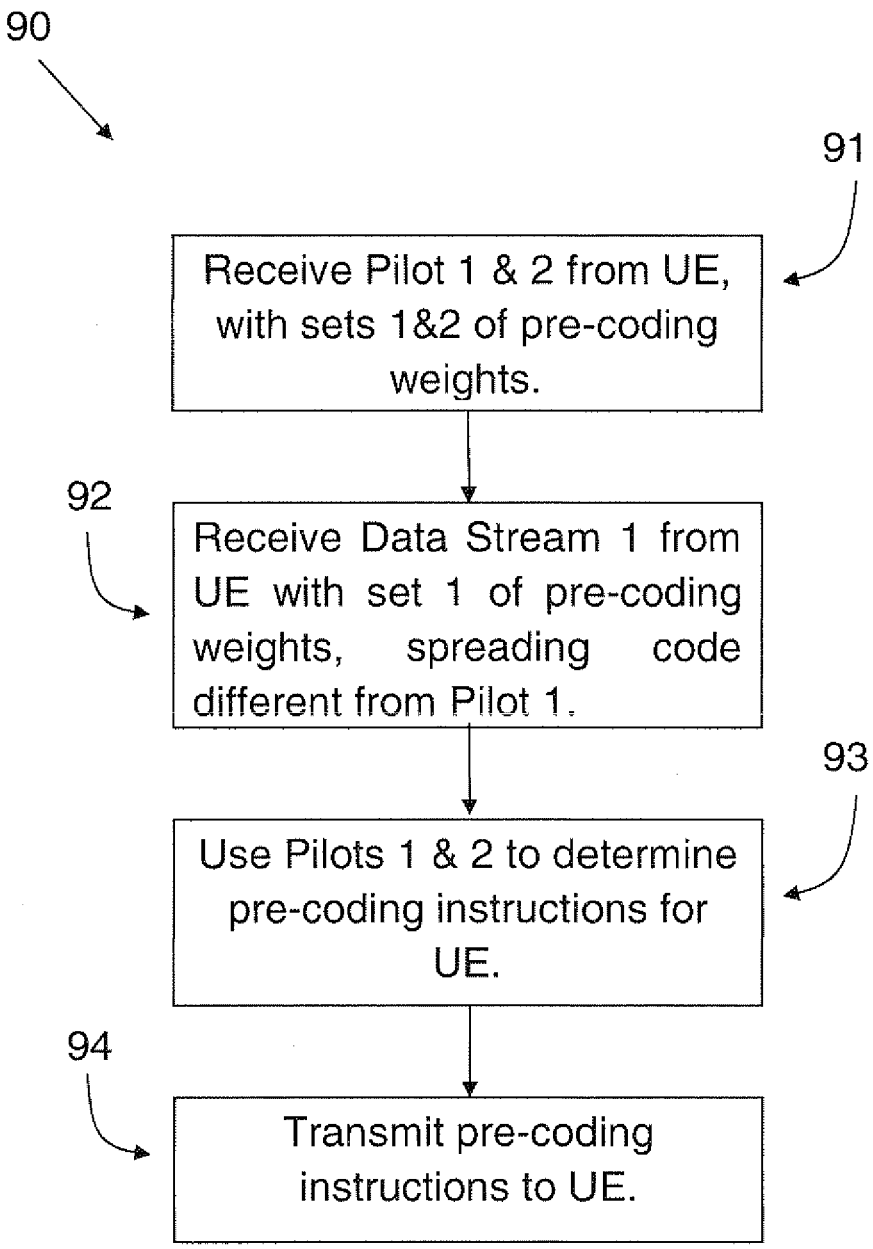
FIG. 10 shows a flow chart of a method for operating a NodeB.

FIG. 10 shows a flow chart for a method 90 for operating a NodeB such as the one 105, i.e. a NodeB for an HSPA enabled WCDMA system. As indicated in step 91, the method 90 comprises receiving from a UE a first and a second pilot signal transmitted from the UE with respective first and second sets of pre-coding weights, as well as, as indicated in step 92, receiving from the UE a first data stream which has been transmitted from the UE with said first set of pre-coding weights but with a different spreading code than the first pilot signal.

In addition, as indicated in step 94, the method 90 comprises transmitting instructions to the UE on at least one of the first and second sets of pre-coding weights, and using said first and second pilot signals in order to, as indicated in step 93, determine said instructions to the UE.

In embodiments, the method 90 also comprises receiving a second data stream from the UE which has been transmitted using the second set of pre-coding weights, but with a different spreading code than the second pilot signal.

In embodiments, the method 90 also comprises receiving a second data stream from the UE which has been transmitted using the second set of pre-coding weights, and with the same spreading code as the second pilot signal, but in a time-multiplexed manner.

In embodiments, the method 90 also comprises transmitting instructions to the UE regarding different levels of output power that the UE should use for transmitting the first and second pilot signals.

Turning now to the issue of how the NodeB uses the pilot signals in order to arrive at suitable pre-coding vectors for the UE, an example is as follows, if we assume that both the UE and the NodeB are equipped with two antennas: Assume that a radio signal only propagates along one path, i.e. that there is no multi-path propagation. A complex channel coefficient "h" can then be used to describe what has happened with the signal between transmitter antenna "t" (where t is then either 1 or 2) and receiver antenna "r" (where r is then either 1 or 2), i.e. h(r,t). If we simplify this and say that pilot signal 1 is transmitted from transmit antenna number 1, the receiver can then compare the known pilot signal 1 with the received signal at receiver antennas 1 and 2, and in this way estimate channel coefficients h(1,1) and h (2,1), i.e. the individual channels between transmitter antenna 1 and receiver antenna 1, and transmitter antenna 1 and receiver antenna 2. However, the receiver will in this case know nothing about the channels between transmitter antenna 2 and receiver antennas 1 and 2, i.e. h(1,2) and h(2,2), but these channels can be estimated in the same manner as for the two channels described previously if pilot number 2 is transmitted from transmit antenna number 2.

The total channel between the UE and the NodeB comprises these coefficients together. For example, in MIMO applications, such a total channel is often represented by a channel matrix H, where H=[h(1,1) h(1,2): h(2,1) h(2,2)]. The received signal at the NodeB can then be described as y=H*x+n, where:

y is a vector with a received sample at receiver antenna number 1 as its first element and a received sample at receiver antenna 2 as its second element, and x is a vector with the WCDMA symbol which was transmitted from transmitter antenna 1 as its first element, and the WCDMA symbol which was transmitted from transmitter antenna 2 as its second element, and n is a vector which symbolizes noise.

In order to determine which pre-coding vector that would give the best received signal, it is necessary to know the entire channel H. If the channel is one which has multipath propagation, the channel needs to be represented by more than one matrix (suitably one matrix per path), and the pre-coding vector or vectors which have been used must be taken into consideration when estimating the total channel, or, alternatively, the pre-coding must be "discounted", i.e. a backwards calculation needs to be performed which removes the effects of the pre-coding.

Assume further now that H=[1, −0.8; 0.6, −0.5]. The pre-coding vector v should then be [1; −1] (if only phase shifting of the transmitted signal is allowed, and the amplitude needs to be 1 in the pre-coding), since we then get y=H*v*s+n, where y is the received signal at the NodeB, s is the WCDMA symbol which was transmitted, and n is noise.

The total channel is then H*V, and includes the pre-coding and describes what happens to the WCDMA symbol between the transmitter and the receiver. In our example, we then get [1, −0.8; 0.6, −0.5]*[1; −1]=[1.8; 1.1].

Thus, the received signal at receiver antenna 1 will be the transmitted WCDMA symbol with an amplitude which has been amplified by 1.8, and at receiver antenna 2 the received signal will be the transmitted WCDMA symbol with an amplitude which has been amplified by 1.1.

If, as an example, we had instead chosen the pre-coding vector [1;1] the total channel would then have been [1, −0.8; 0.6, −0.5]*[1; 1]=[0.2; 0.1], i.e. the received signal would have been much weaker than with pre-coding vector [1; −1].

If, as a further example, we had instead chosen the pre-coding vector [1;0], i.e. to use only transmit antenna 1, the total channel would then have been [1; 0.6], i.e. the received signal would have been much weaker than with pre-coding vector [1; −1].

Thus, if the NodeB knows the characteristics of the total channel in the form of its channel coefficients, all of the available pre-coding vectors can be evaluated in order to find the one which would give the best received signal. Other options for determining a pre-coding vector for pilot 1 (which is transmitted with the same pre-coding as data stream 1, which in one embodiment is the only data stream) is to an use expression for SNR or SINR and to choose the pre-coding vector which gives the largest SINR for data stream 1.

Embodiments of the invention are described with reference to the drawings, such as block diagrams and/or flowcharts. It is understood that several blocks of the block diagrams and/or flowchart illustrations, and combinations of blocks in the block diagrams and/or flowchart illustrations, can be implemented by computer program instructions. Such computer program instructions may be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

In some implementations, the functions or steps noted in the blocks may occur out of the order noted in the operational illustrations. For example, two blocks shown in succession may in fact be executed substantially concurrently or the blocks may sometimes be executed in the reverse order, depending upon the functionality/acts involved.

In the drawings and specification, there have been disclosed exemplary embodiments of the invention. However, many variations and modifications can be made to these embodiments without substantially departing from the principles of the present invention. Accordingly, although specific terms are employed, they are used in a generic and descriptive sense only and not for purposes of limitation.

The invention claimed is:

1. A User Equipment, a UE, for an HSPA enabled WCDMA system, the UE being equipped with at least a first and a second transmit antenna, the UE being arranged to use one or more sets of pre-coding weights, each pre-coding weight in said one or more sets to be used by the UE for multiplication with information which is transmitted from one of the UE's antennas, the UE further being arranged to receive instructions from a NodeB on the set or sets of pre-coding weights to be used, the UE also being arranged to transmit a first and a second pilot signal, and to use a first set of pre-coding weights for the first pilot signal and a second set of pre-coding weights for the second pilot signal, where the first set of pre-coding weights is the same as the UE uses for transmitting a first data stream, and to use different spreading codes for the first data stream and for the first pilot signal, and wherein an output power of the second pilot signal is offset relative to an output power of the first pilot signal, wherein the UE being arranged to receive a value of the offset from said NodeB via radio resource signaling, wherein the UE being arranged to use the pilot symbols of the WCDMA DPCCH channel as the first pilot signal, wherein the UE being arranged to use as the second pilot signal the pilot symbols of another WCDMA channel, wherein the pilot symbols of the other WCDMA channel use the same slot format as the pilot symbols of the WCDMA DPCCH channel, and wherein the UE being arranged to use different spreading codes for the WCDMA DPCCH channel and said other WCDMA channel.

2. The UE of claim 1, being arranged to also transmit a second data stream using the second set of pre-coding weights, and to use different spreading codes for the second data stream and for the second pilot signal.

3. The UE of claim 1, being arranged to also transmit a second data stream using the second set of pre-coding weights, and to transmit the second data stream and the second pilot signal with the same spreading code but in a time-multiplexed manner.

4. The UE of claim 1, being arranged to use a first and second set of pre-coding weights which are orthogonal to each other.

5. The UE of claim 1, also being arranged to use different levels of output power for transmitting the first and second pilot signals.

6. The UE of claim 5, being arranged to and to receive instructions on the different power levels from said NodeB.

7. The UE of claim 1, being arranged to include control signaling and/or data symbols in said other WCDMA channel.

8. The UE of claim 1, being arranged to use the pilot symbol sequence of the WCDMA DPCCH channel as the first pilot signal and to use as the second pilot signal a sequence of pilot symbols which the UE is arranged to transmit with the same spreading code as the WCDMA DPCCH channel but which is orthogonal to the pilot symbol sequence of the WCDMA DPCCH channel.

9. The UE of claim 1, being arranged to use a number of pilot signals which is equal to the number of antennas of the UE.

10. A NodeB for an HSPA enabled WCDMA system, the NodeB being arranged to receive from a UE a first and a second pilot signal transmitted from the UE with respective first and second sets of pre-coding weights, as well as to receive from the UE a first data stream which has been transmitted from the UE with said first set of pre-coding weights but with a different spreading code than the first pilot signal, the NodeB being arranged to transmit instructions to the UE on at least one of the first and second sets of pre-coding weights, and to use said first and second pilot signals in order to determine said instructions, and wherein an output power of the second pilot signal is offset relative to an output power of the first pilot signal, wherein the NodeB is further arranged to send a value of the offset from said UE via radio resource signaling, wherein the pilot symbols of a WCDMA DPCCH channel are used as the first pilot signal, wherein the pilot symbols of another WCDMA channel are used as the second pilot signal, wherein the pilot symbols of the other WCDMA channel use a same slot format as the pilot symbols of the WCDMA DPCCH channel, and wherein different spreading codes are used for the WCDMA DPCCH channel and the other WCDMA channel.

11. The NodeB of claim 10, being arranged to also receive a second data stream from the UE which has been transmitted using the second set of pre-coding weights, but with a different spreading code than the second pilot signal.

12. The NodeB of claim 11, being arranged to also receive a second data stream from the UE which has been transmitted using the second set of pre-coding weights, and with the same spreading code as the second pilot signal, but in a time-multiplexed manner.

13. The NodeB of claim 10, being arranged to transmit instructions to the UE regarding different levels of output power that the UE should use for transmitting the first and second pilot signals.

14. A method for operating a User Equipment, a UE, for an HSPA enabled WCDMA system, the UE being equipped with at least a first and a second transmit antenna, the method comprising receiving instructions from a NodeB on one or more sets of pre-coding weights to be used in transmissions from the UE, the method comprising using each pre-coding weight in said one or more sets for multiplication with information which is transmitted from one of the UE's antennas, the method further comprising transmitting a first and a second pilot signal, and using a first of said sets of pre-coding weights for the first pilot signal and a second of said sets of pre-coding weights for the second pilot signal, and also using the first set of pre-coding weights for transmitting a first data stream, the method further comprising using different spreading codes for the first data stream and for the first pilot signal, and wherein an output power of the second pilot signal is offset relative to an output power of the first pilot signal, wherein the UE receives a value of the offset from said NodeB via radio resource signaling, wherein the UE uses the pilot symbols of a WCDMA DPCCH channel as the first pilot signal, wherein the uses as the second pilot signal the pilot symbols of another WCDMA channel, wherein the pilot symbols of the other WCDMA channel use a same slot format as the pilot symbols of the WCDMA DPCCH channel, and wherein the UE uses different spreading codes for the WCDMA DPCCH channel and said other WCDMA channel.

15. The method of claim 14, further comprising transmitting a second data stream using the second set of pre-coding weights, and using different spreading codes for the second data stream and for the second pilot signal.

16. The method of claim 14, further comprising transmitting a second data stream using the second set of pre-coding weights, and transmitting the second data stream and the second pilot signal with the same spreading code but in a time-multiplexed manner.

17. The method of claim 14, comprising using different levels of output power for transmitting the first and second pilot signals.

18. A method for operating a NodeB for an HSPA enabled WCDMA system, the method comprising receiving from a UE a first and a second pilot signal transmitted from the UE with respective first and second sets of pre-coding weights, as well as receiving from the UE a first data stream which has been transmitted from the UE with said first set of pre-coding weights but with a different spreading code than the first pilot signal, the method comprising transmitting instructions to the UE on at least one of the first and second sets of pre-coding weights, and using said first and second pilot signals in order to determine said instructions to the UE, and wherein an output power of the second pilot signal is offset relative to an output power of the first pilot signal, wherein the NodeB sends a value of the offset from said UE via radio resource signaling, wherein the pilot symbols of a WCDMA DPCCH channel are used as the first pilot signal, wherein the pilot symbols of another WCDMA channel are used as the second pilot signal, wherein the pilot symbols of the other WCDMA channel use a same slot format as the pilot symbols of the WCDMA DPCCH channel, and wherein different spreading codes are used for the WCDMA DPCCH channel and the other WCDMA channel.

19. The method of claim 18, comprising also receiving a second data stream from the UE which has been transmitted using the second set of pre-coding weights, but with a different spreading code than the second pilot signal.

20. The method of claim 18, comprising also receiving a second data stream from the UE which has been transmitted using the second set of pre-coding weights, and with the same spreading code as the second pilot signal, but in a time-multiplexed manner.

21. The method of claim 18, comprising transmitting instructions to the UE regarding different levels of output power that the UE should use for transmitting the first and second pilot signals.

* * * * *